Sept. 22, 1953 — R. W. LEWIS — 2,653,006
PIPE LIFTER
Filed Jan. 6, 1950 — 2 Sheets-Sheet 1
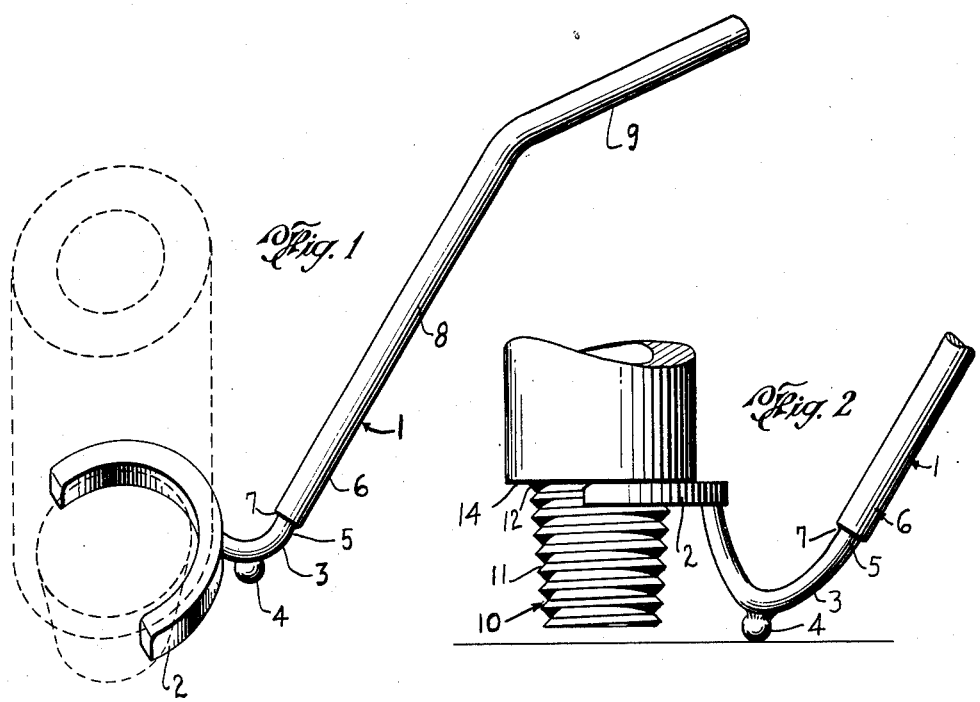
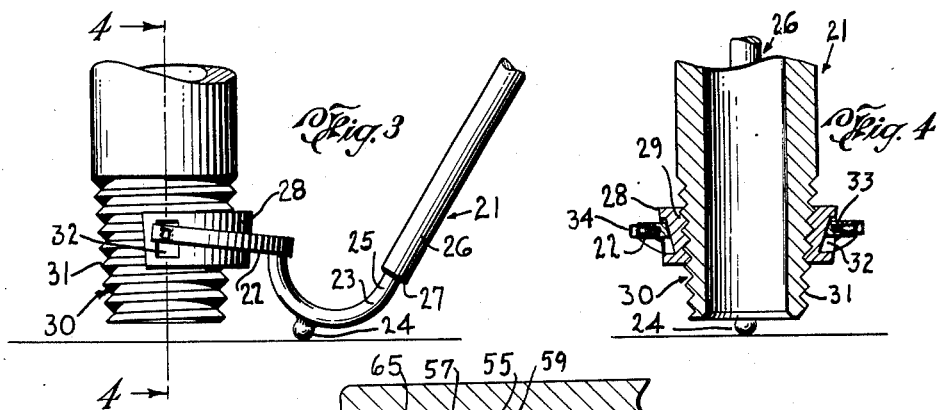
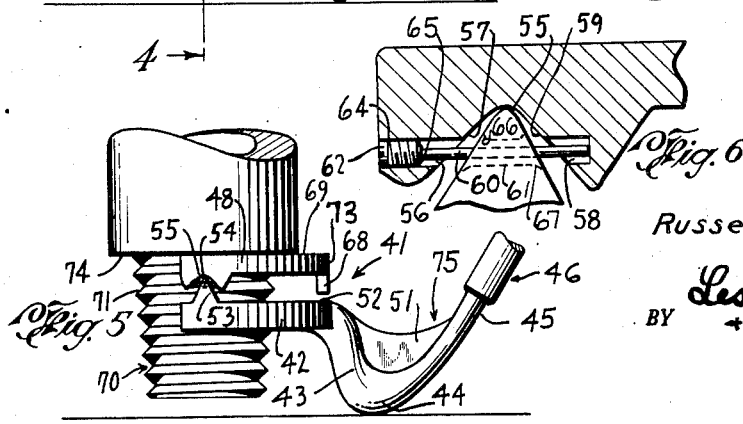
Russel W. Lewis
INVENTOR.
BY Lester B. Clark
 + Ray L. Smith
ATTORNEYS.

Sept. 22, 1953  R. W. LEWIS  2,653,006
PIPE LIFTER
Filed Jan. 6, 1950  2 Sheets-Sheet 2
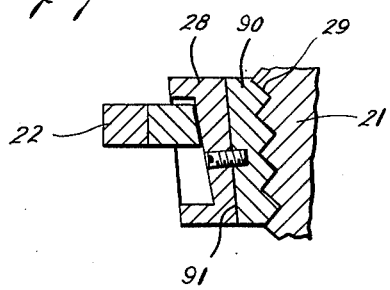
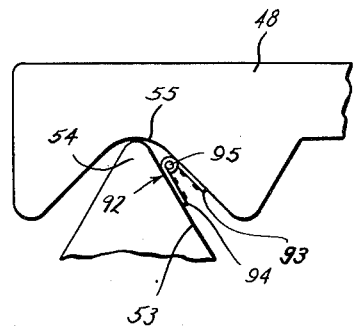
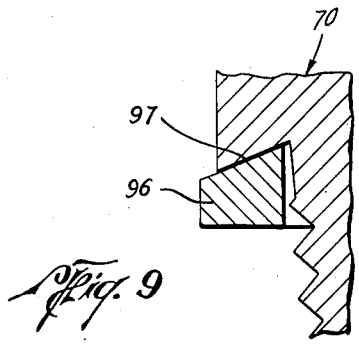
Russel W. Lewis
INVENTOR.
BY Wm. E. Ford
ATTORNEY Patented Sept. 22, 1953

2,653,006

UNITED STATES PATENT OFFICE 2,653,006

PIPE LIFTER

Russel W. Lewis, Lafayette, La., assignor to Gem Oil Tool Company, Inc., Lafayette, La., a corporation of Louisiana Application January 6, 1950, Serial No. 137,252

3 Claims. (Cl. 254—131)

This invention relates to a pipe lifter for handling pipe, as drill pipe lengths which are to be stood up vertically and in alignment on a drilling rig. Its usage is not thus limited, as it may be employed wherever it may be desired to handle and align pipe.

It is an object of this invention to provide a pipe lifter for handling pipe lengths which are to be stood up vertically and in alignment on a base, as the floor of a drilling rig.

It is another object of this invention to provide a pipe lifter of this class which is adapted to prevent injuring the tool joint pin shoulder of the drill pipe length being handled.

It is also an object of this invention to provide a pipe lifter of this class which will not slip off the pin shoulder of a pipe length when being used on a slick floor, thereby avoiding damage to equipment and accident to personnel.

It is a further object of this invention to provide a pipe lifter of this class which is adapted to fully contact the pin shoulder of a drill pipe length being handled.

It is also an object of this invention to provide a pipe lifter of this class having interchangeable shoe members so that a single size of handle and yoke unit may be employed to handle pins of various lengths and shoulder sizes.

It is still a further object of this invention to provide a pipe lifter of this class which is adapted to employ the fulcrum principle of lifting pipe, and which is also adapted to move the pipe directionally of the fulcrum as it is lifted.

It is yet another object of this invention to provide a pipe lifter of this class which is simply constructed by having the pin shoulder contacting member and the fulcrum member thereof rigidly connected.

It is also a further object of this invention to provide a pipe lifter of this class which is adapted to handle the taper threaded pin of a pipe length having a pin not provided with a shoulder.

It is also a further object of this invention to provide a pipe lifter of this class which has an angular handle adapted to permit easy manipulation of the pipe being handled.

It is still a further object of this invention to provide a pipe lifter of this class equipped with a shoe or shoulder-contacting member which is adapted to fit any type of pin shoulder configuration.

Other and further objects will be apparent when the specification is considered in connection with the drawings, in which:

Figure 1 is a perspective view of one modification of a pipe lifter;

Fig. 2 is an elevation of the pipe lifter of Fig. 1;

Fig. 3 is an elevation of a second modification of a pipe lifter;

Fig. 4 is a sectional elevation taken along line 4—4 of Fig. 3;

Fig. 5 is an elevation of a third modification of a pipe lifter;

Fig. 6 is an enlarged, fragmentary, sectional elevation of the pipe lifter of Fig. 5.

Fig. 7 is a sectional, fragmentary elevation of a modification of the pipe lifter shown in Fig. 4.

Fig. 8 is a fragmentary elevation showing a modified connection similar to that illustrated in Fig. 5.

Fig. 9 is a sectional fragmentary view of a modified pipe shoulder contact shoe.

In the drilling of wells, as oil wells, it is necessary to add pipe lengths, usually a stand or a ninety-foot length at a time, as drilling progresses. Then, when it becomes necessary to pull the pipe string, or "make a trip" out of the well pipe is withdrawn, usually a stand or ninety-foot length at a time, until all of the pipe is out. These stands, while not being added to, or subtracted from, the drill string, stand up vertically on the derrick floor, with the upper ends thereof being held in a pipe rack adjacent the platform upon the derrick at substantially stand height above the floor.

Each stand of pipe usually comprises three thirty-foot pipe lengths, assembled with the pin or externally taper-threaded, male connections lowermost, and the box, or internally threaded, female connections uppermost. These pin members usually are shouldered adjacent the uppermost, largest diameter thread of the pin, but on occasion pipe is employed in which the taper terminates at the beginning of the pipe body in certain cases where shoulders may not be desirable.

The equipment conventionally employed in moving stands of pipe is a wrench jaw construction which of necessity requires that the jaw is much harder than the material of the pipe to be moved. It often happens that the sharp edge of such a jaw will bite into the pin shoulder of the pipe. Then, in cases where high pressure fluid may leak past the pipe threads to the shoulder, the outward passage of the fluid, at high velocity, through the marred place in the pipe shoulder will wear away the metal of the shoulder. The escape of fluid in this manner can result in great financial loss or in even the loss of the well in cases where the string may be severed at the point of wear by the weight suspended therebelow.

With conventional equipment, as that of the wrench jaw type, there is always the danger of the accidental burring of threads and marring of pin surfaces when the heavy stands of pipe are being transferred to, and aligned in, rack position. The pin threads of a stand being transferred may strike upon the shoulder corner or pin threads of a stand which is in rack position but not properly aligned. Also, a conventional wrench jaw type pipe lifter may slip off of a stand and the lowermost pin shoulder thereof become marred as a result. The pipe lifters of this invention set out to protect against these occurrences, and the structures by which such occurrences are avoided are herewith described.

In the modification of Figures 1 and 2, the pipe lifter has the pin shoulder contacting member 2, which may be termed either the yoke or the shoe, integrally formed with, or rigidly connected to, the arcuate connection member 3. This member 3 has thereon the fulcrum 4, which is preferably of a spherical construction. The connection member 3 terminates upwardly in a straight portion 5 over which is slid the handle 6, which may be either welded to the portion 5 at 7, or which optionally may be releasably connected thereto, as by a pin. The handle 6 has at the upper end thereof the grip 9, which extends at an angle from the lower handle portion 8 to facilitate handling.

This type of pipe lifter is of simple construction and is best adapted for use where a single type and size of pin 10 is employed, having the thread length 11, the top of base pin diameter 12, and the shoulder width 14.

In the modification shown in Figures 3 and 4, the pipe lifter 21 has the yoke 22, connection member 23, fulcrum 24, and straight portion 25 rigidly connected, and the handle 26 is fitted onto the straight portion 25 at 27, as hereinabove described. The yoke 22 is substantially semi-circular in shape, and supports the shoe 28, which has jaws 29 adapted to fit into the threads 31 of the pin 30.

The jaws 29 are shown as an integral part of the shoe 28, but it can be seen, as shown in Fig. 7, that an optional structure might include jaws 29 on a tapered ring 90 which are insertable in the shoe 28, which can be tapered at 91 to have the ring pressed thereinto, thus permitting easy replacement of the jaws when they become worn. As an added expedient, the shoe and ring may be connected by set screws.

Slots 32 are provided on either side of the shoe 28. Lugs 33 are rigidly connected to the yoke 22, and these lugs extend into the slots 32 to establish the pivotal connection between shoe 28 and yoke 22, the slots being of a width and length to workably receive the lugs.

Shoes 28 to fit various diameter pins 30 may be employed with the same yoke 22 by employing lugs 33 of various sizes between yoke and shoe to be connected to the yoke by pins 34 of various lengths to be passed through the yoke and threaded into the lug. It is herein pointed out, however, that any other method of connecting the yoke to shoes adapted to grasp various diameter pin threads is considered. Also, it is additionally pointed out that this modification is not limited to the features of construction disclosed, but any other suitable structure may be employed for pivotally connecting yoke and shoe, and for gripping without marring the pin threads.

The preferred modification is shown in Figures 5 and 6, in which the pipe lifter 41 has the yoke 42, the connection member 43, and the straight portion 45 as rigidly connected members, with the fulcrum 44 being a part of the connection member 43. In this modification a web 51 is added to the member 43 to lend strength thereto. The handle 46 is fitted onto the straight portion 45, as hereinabove described.

The yoke 42 has on either side of the upper face 52 the support ridges 53 of substantially triangular cross section, and these ridges provide the secondary fulcrum 54, about which the shoe 48 pivots. As shown most clearly in Fig. 6, the shoe 48 has the notches 55 therein, with the pin hole 56 extending through the notch face 57 and the pinhole 58 extending through the notch face 59. The pin 60 passes through the hole 61 in the support ridge 53, and its ends extend into the holes 56 and 58. The set screw 62 in a threaded hole 64, coaxial with, and joining pinhole 56, is threaded in to contact the pin end 65, and this holds the pin 60 rigidly in place.

The hole 61 in the support ridge 53 is substantially larger than the pin 60, and the throats 66 and 67 at either end of the hole are curved outwardly. This feature, plus the additional fact that the notch face 57 joins the notch face 59 at a substantial angle, permits the easy pivoting of yoke 42 in the shoe 48.

The guide lug 68 on the lower side of the shoe 48 spaces the yoke and shoe faces apart when the pipe lifter 41 is being positioned to lift a stand of pipe; and while this is being done, the upper face 69 of the shoe 48 is in a substantially horizontal plane.

This modification is designed especially for handling pipe having shouldered pins 70; and shoes having various side lengths 73 and face dimensions may be employed with the same pipe lifter unit assembly 75. Thus this modification is readily adaptable for handling pipe having various pin lengths 71 and shoulder dimensions 74.

It is additionally pointed out that this invention is not limited to the type of connection shown in Fig. 6, but any other type is considered, as the hinged type shown in Fig. 8 providing a hinge 92 having one hinge flap 93 connected to the shoe 48 and the other 94 to the yoke 42 so that the hinge pin 95 acts as the fulcrum but is located so it does not support the weight thereabove.

It is herein pointed out that the proportion of connection members, fulcrums, handle portions 8 and grips 9 are developed to permit the greatest mechanical advantage and maneuverability.

The distance from fulcrums to the top surfaces of yoke 2 or shoes 28 and 48 is not too great to prevent the handling of pipe having short pin lengths 11, 31, or 71.

It is herein pointed out that, whereas Fig. 2 shows a shoulder which extends perpendicularly to the longitudinal axis of the pipe, the modification of Figures 1 and 2 and that of Figures 5 and 6 may also be adapted to handle shoulders which are tapered upwardly and inwardly in order to obtain a tighter connection. In such cases, as shown in Fig. 9, elements 96, similar to yokes 2 and shoes 48 are provided, which also have upwardly and inwardly tapered top surfaces 97 to conform with the pipe to be handled.

Broadly, this invention considers a pipe lifter designed to support a substantial area of pin shoulder when shouldered pin type of pipe is being handled. It also considers a pipe lifter which provides the highest mechanical advantage and maneuverability by virtue of arrangement of members. It further considers a pipe lifter adapted to handle pipe having pins without shoulders thereon. It also considers a pipe lifter which can be adapted to handle shouldered pin type pipe of various pin lengths and of various shoulder dimensions.

What is claimed is:

1. A pipe lifter comprising, an arcuate yoke, an arcuate connection member having one end connected to said yoke and extending downwardly at a slight angle to the vertical while the arc of said member extends in a plane substantially perpendicular to the plane of said yoke, a fulcrum at substantially the apex of said connection member, a handle connected to the other end of said connection member and extending substantially tangentially therefrom, an arcuate shoe having an upper surface adapted for supporting pipe shoulders, notches in the lower shoe surface adjacent the arc ends thereof, ridges adjacent the arc ends of said yoke with the ridge crest adapted to support said shoe at the notch apices, and means pivotally connecting said ridges and said shoe.

2. A pipe lifter comprising an arcuate yoke member, a substantially J-shape lever whose base serves as a fulcrum and whose upturned short leg is rigid with said yoke member, an arcuate shoe member having an upper surface arranged for flat abutment throughout the major area of its arcuate extent with a pipe shoulder and having its lower surface in juxtaposed relation with the upper surface of said yoke member, notches in one of said surfaces adjacent the arc ends of the notch carrying member, ridges adjacent the arc ends of the other member with the ridge crests supporting said shoe at the notch apices and means pivotally connecting said ridges and the notch carrying member.

3. For use in laterally shifting on a well drilling floor, the alignment position of a vertically disposed drill pipe section whose lower end terminates in a flat annular shoulder from which projects a short screw threaded coupling portion of reduced diameter, a pipe jack including a semi-ring shape bearing shoe having an internal radius corresponding substantially to the radius of said reduced diameter portion and having a flat upper bearing surface for mating abutment with said shoulder throughout substantially 180° of its circumferential extent, a lever of substantially J-shape to rockably bear at its base on the floor, and a connection between the shorter leg of said J-shape lever and said shoe so arranged as to present a semi-ring flat upper bearing surface in a substantially horizontal plane corresponding to the plane of a flat annular shoulder of a pipe section when said shorter leg is in its normal load supporting position, the vertical distance to the floor from the semi-ring upper bearing surface when the shorter leg is in load supporting position being slightly greater than the vertical length of said reduced diameter coupling portion, whereby the supported pipe weight is transferred from the pipe section shoulder through substantially 180° of flat abutment with the semi-ring shape shoe.

RUSSEL W. LEWIS.

References Cited in the file of this patent

UNITED STATES PATENTS

| Number | Name | Date |
|---|---|---|
| 139,443 | Wattendorf | May 27, 1873 |
| 173,228 | McKenna | Feb. 8, 1876 |
| 1,034,874 | Clark | Aug. 6, 1912 |
| 1,163,230 | Gartland | Dec. 7, 1915 |
| 1,254,778 | Comfort | Jan. 28, 1918 |
| 1,421,689 | Hopkins et al. | July 4, 1922 |
| 1,562,148 | Carlson | Nov. 17, 1925 |
| 2,135,802 | Dinkins | Nov. 8, 1938 |

FOREIGN PATENTS

| Number | Country | Date |
|---|---|---|
| 258,772 | Great Britain | Sept. 30, 1926 |